United States Patent [19]
Leffke et al.

[11] Patent Number: 4,562,790
[45] Date of Patent: Jan. 7, 1986

[54] IN-LINE EGG OILER

[75] Inventors: Robert C. Leffke, Fort Myers; Sylvester Sauder, North Fort Myers, both of Fla.

[73] Assignee: Frank J. Cismoski, Oak Lawn, Ill.

[21] Appl. No.: 638,629

[22] Filed: Aug. 7, 1984

[51] Int. Cl.⁴ .......................... B05B 1/04; B05B 15/00
[52] U.S. Cl. ........................................ 118/24; 118/326
[58] Field of Search ............................ 118/24, 25, 326; 239/338, 370, 432

[56] References Cited

U.S. PATENT DOCUMENTS

| | | | |
|---|---|---|---|
| 2,618,562 | 11/1952 | Mulvany | 118/24 X |
| 3,053,223 | 9/1962 | Hensen et al. | 118/326 X |
| 3,251,556 | 5/1966 | Burnham | 239/338 |
| 3,382,845 | 5/1968 | Jester | 118/326 |

Primary Examiner—Shrive P. Beck
Attorney, Agent, or Firm—Hauke and Patalidis

[57] ABSTRACT

An oiler for depositing oil, in the form of a fine mist or fog, on articles traveling on a conveyor belt, and more particularly eggs in an in-line egg processing apparatus. The oiler is in the form of an enclosure disposed above the conveyor. A nozzle disposed within the enclosure sprays a fine fan-shaped spray of oil impinging upon the bottom floor of the enclosure. An air blower supplies a flow of turbulent air to the interior of the enclosure for slightly pressurizing the interior of the enclosure and creating a fine oil mist or fog which is exhausted from the enclosure through slots at the bottom of the enclosure for coating the shells of the eggs traveling below the enclosure on a conveyor belt.

8 Claims, 4 Drawing Figures

IN-LINE EGG OILER

BACKGROUND OF THE INVENTION

The invention relates to an apparatus for oiling eggs, subsequent to cleaning the eggs and prior to packaging.

It is common practice to clean eggs on an automatic egg cleaning apparatus prior to packaging the eggs by means of an automatic packager. While being transported on a conveyor belt, the eggs are passed through a washing station where they are washed with detergent and hot water, and scrubbed by rotary brushes. The eggs are subsequently passed through a drying station in which the shells are dried by a flow of air.

The washing step removes from the surface of the eggshells the natural oil normally coating newly laid eggs. It is necessary to reseal the eggshell pores to prevent loss of carbon dioxide and mositure, prior to packaging the eggs. This is accomplished conventionally by oiling the surface of the eggshells, either by spraying the eggs with mineral oil as they pass below a spray head while being transported on the conveyor belt, by applying a relatively large quantity of oil to the top of the eggs with reliance on gravity for dripping the excess oil over the whole surface of each shell, by wiping the surface of the eggshells with soft brushes supplied with oil, by simply dipping the eggs in an oil bath, or by oiling them by hand.

All the methods and apparatus hereto available for oiling eggs on the conveyor belt of an in-line egg processing apparatus present the inconveniences that far from the optimum quantity of oil is applied to the eggshells, and generally result in an excess of oil being applied, which in turn causes an inconvenience to the comsumer and, in addition, causes considerable waste of oil and requires frequent cleaning of the conveyor belt system.

SUMMARY OF THE INVENTION

The present invention remedies the inconveniences of the prior art by providing an automatic egg oiler that applies to the surface of eggshells a fine coating of oil in an optimum amount, the oil being applied to the shell surface in the form of a fine atomized cloud or fog enabling the coating of the eggs to be effected evenly, and without excess oil, therefore in an economic, precise and efficient manner.

The diverse objects and advantages of the present invention will become apparent to those skilled in the art when the following description of the best mode contemplated at the present for practicing the invention is read in conjunction with the accompanying drawing wherein like numerals refer to like parts and in which:

DETAILED DESCRIPTION OF THE PREFERRED EMBODIMENT

Figures 1, 2:
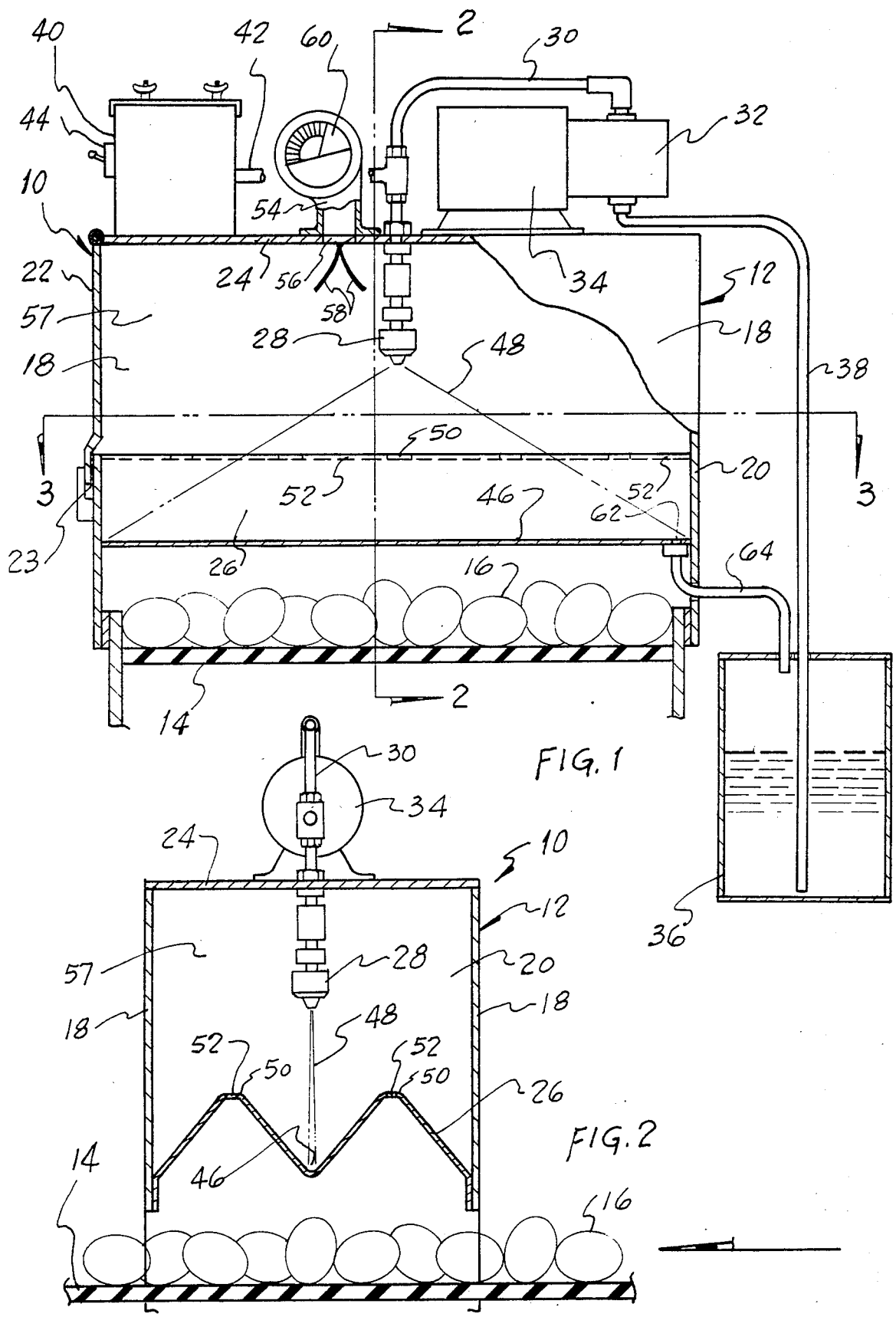
FIG. 1 is a schematic representation, in side elevation, of an egg oiler according to the present invention, with portions broken away for illustrating the internal construction.
FIG. 2 is a transverse section thereof along the line 2—2 of FIG. 1.

With reference to the drawing, and more particularly to FIG. 1, there is illustrated, in a schematic manner and for illustrative purpose only, an egg oiler 10 according to the present invention, in the form of a parallelpipedonal housing 12 mounted above the conveyor belt 14 of an inline egg processing apparatus. The eggs 16 on the conveyor belt 14 continuously travel below the housing 12, for example in the direction of the arrow, FIG. 2. The housing 12 is preferably made of stainless steel panels appropriately welded together such as to form an enclosure having a pair of parallel sidewalls 18, a rear end wall 20, a removable or hinged front wall in the form of a cover 22 provided with a gasket 23 and a top wall 24. A corrugated bottom wall or floor 26 is disposed above the conveyor belt 14 at a distance permitting the eggs 16 to pass therebelow.

A spray nozzle 28 is mounted below the housing top wall 24 and is connected through a conduit 30 to an injection pump 32 driven by an electric motor 34. The pump 32 draws mineral oil from a tank or drum 36, FIG. 1, through a suction line 38. The pump outlet line 30 is also connected to components disposed in a control box 40 via a line or conduit 42. The face of the control box 40 supports appropriate controls such as an on-off switch 44, indicator lights, not shown, and a pressure gauge if so desired, although it will be appreciated that the pressure gauge, connected to the pump outlet conduit 30, may be disposed at any other convenient location on the housing 12.

Figure 3:
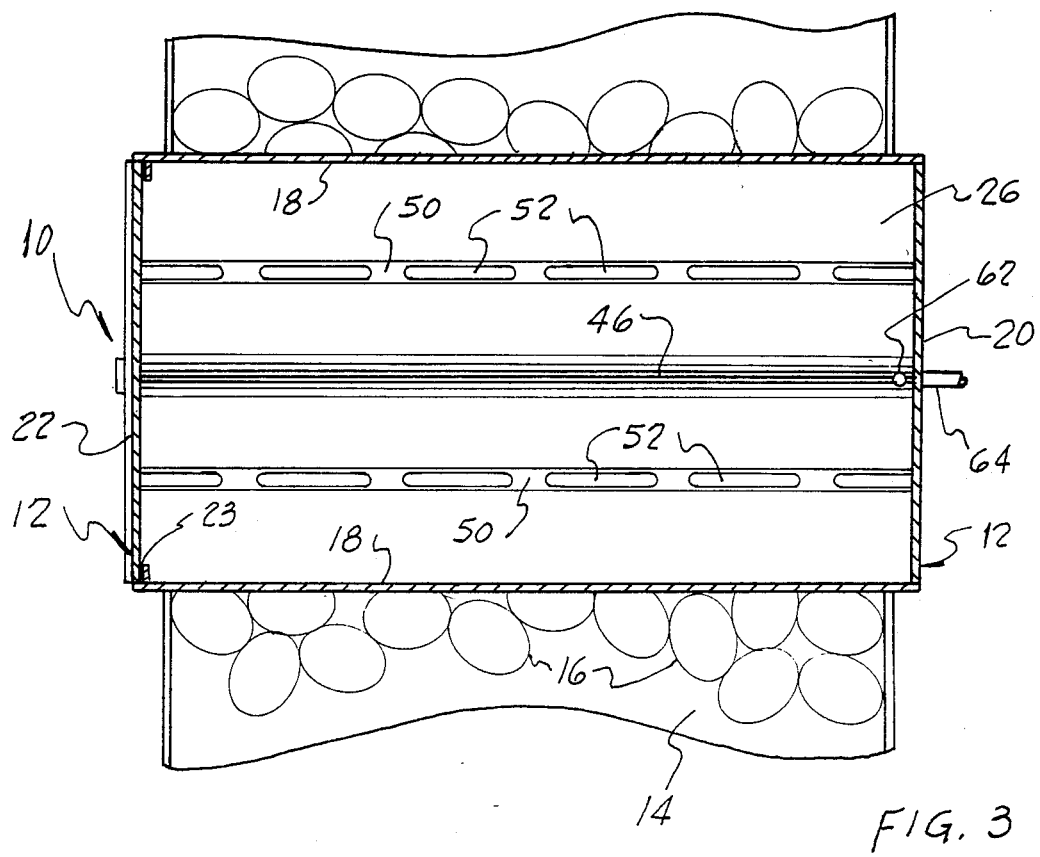
FIG. 3 is a view from line 3—3 of FIG. 1.
Figure 4:
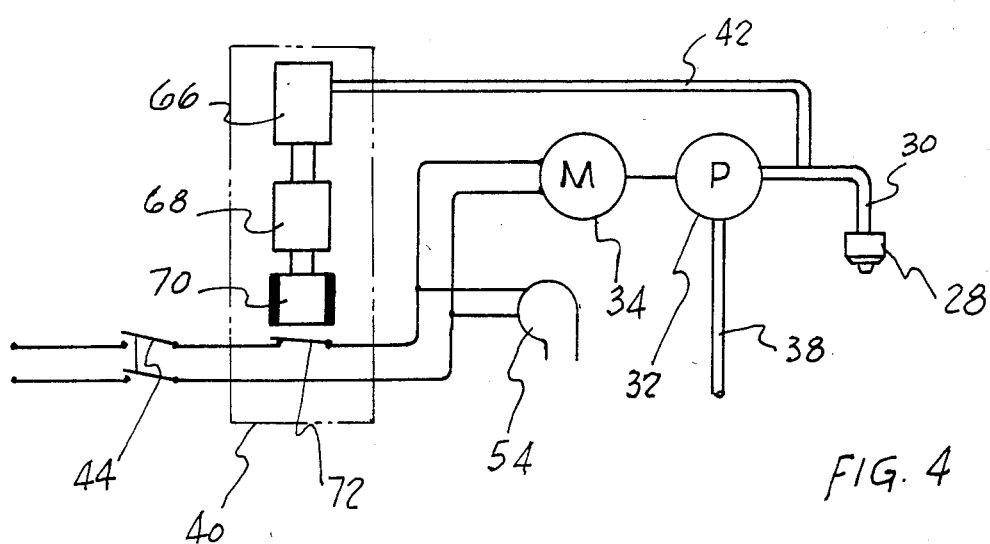
FIG. 4 is a simpled electrical diagram of the apparatus of the invention.

As best shown at FIGS. 2 and 3, the corrugated floor 26 forms a relatively deep trough 46 extending longitudinally in the housing 12 above the conveyor belt 14, transversely to the direction of displacement of the eggs 16 transported by the conveyor belt 14. The trough 46 is disposed substantially directly below the oil spray nozzle 28 and the nozzle 28, when in operation, provides a thin fan-shaped spray 48 directed towards the bottom of the trough 46. The bottom wall or floor 26, as best shown at FIG. 2, is substantially shaped in transverse section as two adjoining inverted V such as to form two rectilinear ridges or peaks 50, substantially equidistant from the bottom of the trough 46, each provided with a row of elongate slots 52.

An electrically driven air blower 54 is mounted on the top of the housing top wall 24. The outlet of the blower 54 is connected through an opening 56 to the chamber 57 defined within the housing 12. A pair of deflector vanes 58 is disposed within the housing 12 below the opening 56 such as to deflect the flow of air throughout the chamber 57 within the housing 12 and cause the air flowing throughout the chamber to be highly turbulent. The fine spray 48 of oil is further finely atomized and transformed into a mist, cloud or fog permeating the whole chamber 57. In addition, the atmosphere within the chamber 57 is slightly pressurized by the blower 54, which causes the mist or fog of oil to escape from the chamber 57 through the slots 52. The mist or fog flowing through the slots 52 deposits a coating of oil on the shells of the eggs 16 traveling below the bottom wall or floor 26 of the housing 12. An adjustable gate or throttling means 60 partially obturates the inlet of the blower 54 for providing an adjustment of the air flow rate through the opening 56 into the chamber 57 within the housing 12. The amount of oil deposited on the eggshells by the fine mist or fog passing through the slots 52 is proportional to the air flow rate into the chamber 57 and, by appropriate adjustment of the blower inlet gate or throttling means 60, the amount of oil coating the eggshells may be adjusted to an optimum value as a function of the speed of travel of the eggs 16 on the conveyor belt 14.

The trough 46 of the housing bottom wall or floor 26 has a drain 62 at one end thereof for returning to the tank 36 the excess liquid oil via a line or conduit 64, simply by gravity or by way of an auxiliary pump, not shown. The proportion of oil returned to the tank 36 by the conduit 64 amounts to the majority of the oil sprayed through the nozzle 28, as only a very small proportion of the sprayed oil becomes sufficiently finely atomized from the spray itself, aided by the circulation of turbulent air being introduced into the chamber of the housing 12 by the blower 54 and by impingement of the small droplets of oil from the spray upon the surface of the bottom of the trough 46. While traveling on the conveyor belt 14, the eggs 16 are caused to rotate, with the result that a coating of oil is deposited over the whole surface of the shells.

FIG. 4 is a schematic representation of the electrical and pressure relay arrangement of the egg oiler of the invention. Upon closing of the switch 44, the motor of the blower 54 and the motor 34 driving the pump 32 are activated. The pump 32 draws oil through the suction line 38 and provides oil to the nozzle 28 at a pre-set pressure, for example, 60 psi, via the conduit 30. As previously mentioned, the conduit 30 is connected through a conduit 42 to components installed in the control box 40 of FIG. 1 that comprise a pressure switch relay 66 which is activated if there is no oil pressure in the conduit 42 connected to the outlet of the pump 32. The pressure switch relay 66, through a delay 68, activates the relay 70 of a normally closed switch 72. Opening of the switch 72 shuts off the pump motor 34. In this manner, in the event that the pump 32 is not supplying any oil pressure at its outlet, which may damage the pump through the lack of oil circulating through the pump, the apparatus is automatically shut off after a predetermined time delay.

It will be appreciated by those skilled in the art that the present invention has applications other than in in-line egg treatment apparatus. For example, oilers according to the invention may be used for depositing on the surface of mechanical parts a fine coating of oil.

Having thus described the present invention by way of an example of structure thereof, modifications whereof will be apparent to those skilled in the art, what is claimed as new is as follows:

1. An in-line part oiler mounted over a conveyor transporting articles to be oiled, said oiler comprising a closed enclosure having a bottom, a spray nozzle mounted in said enclosure, means for supplying oil under pressure to said spray nozzle, an air inlet into said enclosure, means for supplying air under pressure to the interior of said enclosure through said air inlet, a surface in said enclosure upon which a spray of oil from said nozzle impinges, whereby said spray of oil is finely atomized in said enclosure and dispersed in the air in said enclosure as a fine mist, and apertures through the bottom of said enclosure for passing said mist from said enclosure upon the articles traveling on said conveyor, wherein said spray of oil is fan-shaped, said surface is the bottom of said enclosure forming a trough extending substantially in the same direction as said fan-shaped spray for causing said spray to impinge at the bottom of said trough, and said apertures passing said oil mist to said articles traveling on said conveyor are formed at the top of said trough.

2. The oiler of claim 1 further comprising deflector means at said air inlet for creating a turbulent air flow into said enclosure.

3. The oiler of claim 2 wherein said apertures are slots formed at the top of said trough substantially parallel to the bottom of said trough.

4. The oiler of claim 3 wherein said articles are eggs.

5. The oiler of claim 2 wherein said articles are eggs.

6. The oiler of claim 1 wherein said articles are eggs.

7. The oiler of claim 1 wherein said apertures are slots formed at the top of said trough substantially parallel to the bottom of said trough.

8. The oiler of claim 7 wherein said articles are eggs.

* * * * *